United States Patent Office

Re. 24,486
Reissued June 10, 1958

24,486

HIGH-ALPHA CELLULOSE

Reid Logan Mitchell, Morristown, N. J., assignor to Rayonier Incorporated, Shelton, Wash., a corporation of Delaware No Drawing. Original No. 2,805,169, dated September 3, 1957, Serial No. 522,855, July 18, 1955. Application for reissue December 17, 1957, Serial No. 703,468

12 Claims. (Cl. 106—163)

Matter enclosed in heavy brackets [ ] appears in the original patent but forms no part of this reissue specification; matter printed in italics indicates the additions made by reissue.

This invention relates to high-alpha cellulose wood pulp and has for its object the provision of certain improvements in such pulp, and a process of producing viscose solution from the pulp. The invention is particularly concerned with high-alpha cellulose wood pulp primarily advantageous for use in the viscose and acetate processes, and provides improved pulp of this character comprising an added non-ionic water-soluble surfactant consisting of a hydrophobic organic nucleus having attached to it at least two polyethylene terminal units.

The non-ionic surfactants incorporated in the wood pulp are carried along through the various stages of the viscose process and produce important beneficial results in steeping by reducing foaming, in ease of shredding, better filtration, increased fatigue of tire cord made of the viscose, and are particularly effective in the dispersal of resins of the pulp, and as modifiers in the spinning of tire cord.

Refined dissolving pulps usually contain up to 0.15% (based on the bone dry weight of the pulp) of residual natural ether extractable resins. When such residual resins are present in pulp, even in smaller or larger amounts, they exercise a pronounced detrimental effect on the fatigue of filaments made from the pulp by the viscose process. This reduction in fatigue has especially pronounced adverse effects when the filaments are used in tire cord and the like which requires sustained high strength.

In the production of wood pulp, it is not commercially practical under prior practices to remove all of the resins from the refined pulp, thereby eliminating their detrimental effect on tire cord fatigue life.

While I do not wish to predicate this invention on any theory as to the unexpected results achieved, it appears that in the viscose process the non-ionic surfactants disperse the resins not only within the viscose but also keep them in dispersion after coagulation either remaining within the filaments in such dispersed state, or at least being partly washed out of the filaments in dispersed state. The filaments produced do not contain the usual beads or agglomerates (visible under magnification) of natural resins found scattered at random and forming sections of weakness in the filaments. In any event, the fatigue life of the filaments is very materially increased by the solubilizing or dispersion of these resins.

When the non-ionic surfactants are added to pulp of low ether extract used in the viscose process they improve the operation of shredding the alkali cellulose but without the detrimental effect on fatigue of the natural wood resins or without the detrimental effect on fatigue caused by surface active agents which have hitherto been used for replacing the natural wood resins to aid the shredding operation.

The non-ionic surfactants introduced into the reacting constituents of the viscose process as aforementioned give the additional benefits of improving the brightness and color of the yarn or cord and suppressing spinneret cratering. The term "cratering" refers to the formation of incrustations inside and or around the outside of the holes of the spinnerets in spinning, which have the effect of reducing the size of the filaments, causing broken or faulty filaments and other difficulties. In fact, the suppression of spinneret cratering is equal or superior to that achieved by materials used specifically for that purpose.

In the preparation of sheets from refined wood pulp, the purified fibers are first obtained in the form of a slurry in water. The non-ionic surfactants may be incorporated in the wood pulp at any stage in the production of the pulp sheet from the wet fiber slurry. For treating the pulp, the compounds may be incorporated either in the bulk before sheet formation or in the sheet at any stage prior to or after the completion of the drying as by spraying the pulp with an aqueous solution or dispersion. A most practical and convenient method of securing the incorporation of the non-ionic surfactants prior to completion of drying is to incorporate the compound in the refined wood pulp while it is on the sheet forming machine by means of sprays or a rotating roll. Such application may be made to the wet pulp web subsequent to the mechanical removal of water by pressing, or later at any stage while it is passing through the hot dryer rolls prior to completion of drying.

For improving mercerization in the viscose process, the surfaces of the sheets, and preferably each individual fiber, should be completely treated. Where, however, the main purpose of treating the pulp is either to conveniently and accurately add the non-ionic surfactants for purposes of minimizing the detrimental effect of pulp resins on filtration, resin dispersal, fatigue and for suppressing cratering, or to improve the shredding operation, then substantial improvements may also be obtained by treating only portions of the sheet and even by application after drying. For example, for such purposes, the surfactant addition may be applied in the form of a strip during the operation where the dried pulp in roll form is being cut into the form of sheets.

The non-ionic surfactants used in the product and *process* of the invention are compounds having peculiar chemical structures and result in surprising improvements in various stages of the viscose process not achieved with the non-ionic surfactants heretofore incorporated in the viscose processing materials. Such compounds for use in my invention are water-soluble non-ionic compounds which consist of a hydrophobic compound of low water solubility containing at least 2 active hydrogens substituted by at least 2 terminal polyethylene oxide groups each containing from 1.6 to 700 ethylene oxide units.

The compounds used in the product and process of the invention may be represented by the formula:

$$R-\left[(CH_2-CH_2O)_xH\right]_n$$

wherein R is a polypropylene-containing nucleus of an organic hydrophobic compound of low water solubility having from 2 to 4 active hydrogens and in which x varies from 1.6 to 700 and n equals 2 to 4.

When R is the nucleus $-(OC_3H_6)_y-$ with y varying from 19 to 31, and has two terminal polyethylene oxide groups the compound is of the class known as polyalkylene block copolymers. The term "block copolymer," as used herein, will be understood to be the block copolymers of polyethylene oxide and polypropylene oxide which may be represented by the formula:

$$HO(CH_2CH_2O)_x(\underset{\underset{CH_3}{|}}{C}HCH_2O)_y(CH_2CH_2O)_xH$$

in which x and y have average values for particular copolymers of 10 and 19; 3.3 and 28; 6 and 28; 15.5 and 28; and 106 and 28, respectively. In one especially effective block copolymer, the average values of x and y are 15.5 and 28 respectively, x varying from 11 to 17 depending upon the total molecular weight, and the value of y varying from 26 to 31 depending upon the total molecular weight and the value of x. Block copolymers of the aforementioned types are manufactured and sold under the names of Pluronic L–44, Pluronic L–61, Pluronic L–62, Pluronic L–64, and Pluronic F–68 by the Wyandotte Chemicals Corporation of Wyandotte, Michigan.

R is also represented by the nucleus:

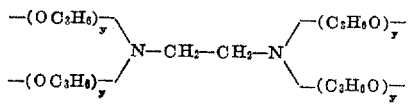

in which y represents average values of from 3 to 17.2. When said nucleus R is combined with four polyethylene oxide radicals the compound is represented by the formula:

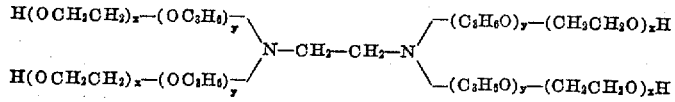

in which x and y have average values of from 2.8 to 437 and 3 to 17.2 respectively, the compound is effective for use in the process of the invention. Such components are manufactured by the Wyandotte Chemicals Corporation and sold under the trademark Tetronics. Tetronics 304, 504, 701, 702, 704, 707, 904 and 908 having average values of x and y of 3.5 and 3.0, 8.1 and 7.3, 2.8 and 11.6, 5.2 and 11.6, 12.8 and 11.6, 47.0 and 11.6, 18.3 and 17.2, and 437 and 17.2 respectively, are especially suitable for use in the invention.

The effective proportion of the non-ionic surfactants, either as regards incorporation in the wood pulp or for purposes of improving any stage in the viscose process is 0.02 to 0.20% based on the weight of bone dry pulp. Above this range in general no additional advantages are obtained and particularly as regards to pulp a disadvantage may result in that the sheet will tend to become undesirably soft. For treatment of pulp for use in acylation processes, a suitable proportion for adding the polymers is from 0.02 to 0.5% based on the weight of bone dry pulp, although larger proportions may be added if desired.

The sheets of wood pulp treated prior to completion of drying with the non-ionic surfactants have markedly improved properties when used in aqueous reactions processes and particularly those involving a mercerizing step as in the viscose process. In these aqueous processes, the treated pulp sheets are wetted and penetrated more rapidly and uniformly by water or sodium hydroxide solution, the case of the latter giving more uniform mercerization. This may be demonstrated by the following rapid test for comparing the absorbency of the sheets of dried pulp in the following example.

EXAMPLE I

Absorbency is determined by allowing a drop of NaOH solution to fall on the pulp sheet from a height of one to two centimeters and measuring the time required for the disappearance of the drop into the sheet.

A sample of pulp when treated with one of the aforementioned surfactants in water solution and redried showed considerably increased absorptivity, indicating more thorough penetration and thereby more effective mercerization in actual viscose processing.

This beneficial effect exerted in the mercerizing process by the non-ionic surfactants as herein incorporated in pulp is notably different from the effect under similar circumstances of normal surface active agents which generally do not cause improved absorptivity or penetration of the pulp by caustic soda solutions of mercerizing strength.

When alkali cellulose prepared by the improved mercerizing process or the improved mercerizing and shredding process of the invention is utilized in the viscose rayon process, certain further improvements are effected in the subsequent steps of xanthating, dissolving, and filtering. In viscose solutions there is usually a certain amount of undissolved fibers and gel-like material due to the incompleted reaction of the cellulose with carbon bisulfide during xanthation. Prior to spinning, the viscose solutions are filtered several times to remove gels and undissolved fibers. In the event that the viscose solutions contain excessive amounts of undissolved and partly dissolved fibers filtration is an expensive operation. In such cases, the filters become rapidly clogged and the filter media, for example cloth, must be changed frequently in order that the viscose will pass through in a reasonable time. Frequent changing of the filter media is expensive, not only in regards to consumption of filter cloth but also in view of the considerable amount of labor involved and the loss of viscose every time the filter is opened. Furthermore, when the viscose solutions contain very large proportions of gel-like material, filtration is usually not altogether satisfactory in that some of the smaller gel-like particles tend to pass through the pores of the cloth with adverse effect on the spinning operations.

Examples showing the effects of the non-ionic surfactants on viscose filterability and on tire cord fatigue properties follow:

EXAMPLE II (a) A tire cord grade cellulose pulp (95% alpha-cellulose) containing 0.10% of natural ether extractable resin was treated with 0.10% of Pluronic L–64 and processed into viscose containing 7.5% cellulose and 6.5% sodium hydroxide with a filterability value of 3500.

This viscose was spun into high tenacity yarn of 1100 denier by extruding it at a salt index of 5.5 into a spin bath containing 9% $H_2SO_4$, 23% $Na_2SO_4$, 3.5% $ZnSO_4$, with no trouble due to cratering. When this yarn was washed in the usual manner, color and dirt, possibly due to the presence of sulfur compounds, were adequately reduced.

This washed yarn was twisted to produce tire cord of 2450 denier having a fatigue life of 285 minutes.

(b) This same pulp but without the added Pluronic L–64 yielded a viscose of 3000 viscose filtration, but gave severe cratering during spinning, gave yarn still containing some slight amounts of colored sulfur compounds, and gave cord having a fatigue life of only 253 minutes.

(c) This same pulp treated with an added 0.10% of mixture of commonly used cratering agents yielded a viscose of 3000 viscose filtration, gave satisfactory protection against cratering, but gave yarn more difficult to wash free from sulfur compounds than the untreated pulp, and gave cord having a fatigue life of only 231.

(d) A repeat of (a) but with 1.0% added Pluronic L–64 gave a viscose filterability of 3700, no cratering, good yarn color, and cord with a fatigue life of 264.

(e) A repeat of (c) but with 1.0 of the same anti-cratering agent gave a viscose filterability of only 340, no cratering, only fair yarn color and cord with a fatigue life of only 190.

EXAMPLE III (a) A cellulose pulp containing an excessively large amount (0.67%) of naturally occurring resin was treated with 0.5% Pluronic L-64 and processed into viscose having a filterability of 1400. The viscose was spun with no spinning difficulties into 1100 denier tire cord yarn. The yarn was converted into 2450 denier tire cord which showed no broken filaments and had a fatigue life of 200. Cross-sections of the filaments of this cord showed practically no agglomerated resin particles or filaments distorted from the resin agglomerates.

(b) This same pulp without the added non-ionic polymer gave a viscose filtration of only 230, gave much spinning difficulty as evidenced by worming and broken filaments, and yielded a cord having a fatigue life of only 4. Cross-sections of filaments revealed (under magnification) many large resin agglomerates which led to brittleness.

EXAMPLE IV (a) A tire cord grade cellulose pulp (96% alpha-cellulose) containing 0.10% of natural ether extractable resin was treated with 0.10% of Tetronic 704 and processed into viscose containing 7.5% cellulose and 6.5% sodium hydroxide with a filterability of 2640.

This viscose was spun into high tenacity yarn of 1650 denier by extruding it at a salt index of 5.5 into a spin bath containing 9.4% $H_2SO_4$, 23.3% $Na_2SO_4$, 3.5% $ZnSO_4$, with no trouble due to cratering. When this yarn was washed in the usual manner, color and dirt, possibly due to the presence of sulfur compounds, were adequately reduced.

This washed yarn was twisted to produce tire cord of 3700 denier having a fatigue life of 327 minutes.

(b) This same pulp, but without the added Tetronic 704, yielded a viscose with a filterability of 2400. The yarn still contained some slight amounts of colored sulfur compounds and gave a cord having a fatigue life of only 305 minutes.

EXAMPLE V

A premium grade tire cord pulp (96% alpha-cellulose) containing 0.06% of natural ether extractable resin was treated with an added 0.10% of a non-ionic surfactant Tetronic 304 and converted into viscose and tire cord.

This tire cord had a fatigue life of 305 as compared with cord from untreated pulp having a fatigue life of 291.

In the foregoing examples the values for filtration represent the amounts of viscose solution passing through the filter before it becomes plugged and ineffective.

This application is a continuation-in-part of the application of Paul Henry Schlosser, Kenneth Russell Gray and Reid Logan Mitchell Serial No. 289,883, filed May 24, 1952.

I claim:

1. An improved high-alpha cellulose dissolving wood pulp suitable for conversion into cellulosic solutions which pulp contains residual ether extractable resins of the wood, and from about 0.02% to about 0.5% based on the bone dry weight of the pulp of an added water-soluble non-ionic compound represented by the formula:

$$R-\left[(CH_2-CH_2O)_xH\right]_n$$

wherein R is a polypropylene oxide-containing nucleus of an organic hydrophobic compound of low water solubility having from 2 to 4 active hydrogens and in which x varies from 1.6 to 700 and n equals the number of active hydrogens.

2. An improved high-alpha cellulose dissolving pulp as defined in claim 1 in which the non-ionic compound is a block copolymer having the formula:

$$HO(CH_2CH_2O)(\underset{\underset{CH_3}{|}}{C}HCH_2O)_y(CH_2CH_2O)_xH$$

in which the average values of x and y vary from 3.3 to 106 and from 19 to 31 respectively.

3. An improved high-alpha cellulose dissolving pulp as defined in claim 1 in which the non-ionic compound is a block copolymer having the formula:

$$HO(CH_2CH_2O)_x(\underset{\underset{CH_3}{|}}{C}HCH_2O)_y(CH_2CH_2O)_xH$$

in which the average values for x and y are about 15.5 and 28 respectively.

4. An improved high-alpha cellulose dissolving pulp as defined in claim 1 in which the non-ionic compound is represented by the formula:

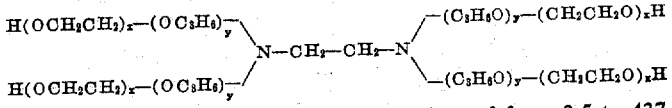

in which x represents average values of from 3.5 to 437 and y represents average values of from 3 to 17.2.

5. An improved high-alpha cellulose dissolving pulp as defined in claim 1 in which the non-ionic compound is represented by the formula:

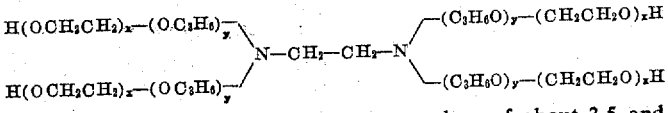

in which x and y have average values of about 3.5 and 3.0 respectively.

6. An improved high-alpha cellulose dissolving pulp as defined in claim 1 in which the non-ionic compound is represented by the formula:

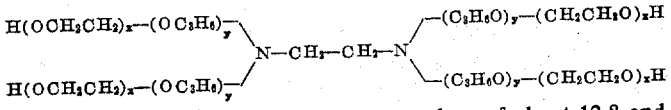

in which x and y have average values of about 12.8 and 11.6 respectively.

7. The improvement in the poduction of filaments by the viscose process which comprises forming a viscose solution from wood pulp containing not more than 0.5% based on the bone dry weight of the pulp of ether extractable resins of the wood, and *including in the viscose* from 0.02% to 0.5% *based on the content of the bone dry pulp* of a water-soluble non-ionic compound which consists of an organic hydrophobic compound of low water solubility containing from 2 to 4 active hydrogens substituted by from 2 to 4 terminal polyethylene oxide groups each containing from 1.6 to 700 ethylene oxide units.

8. The process according to claim 7 in which the non-ionic compound is a block copolymer having the formula:

$$HO(CH_2CH_2O)_x(\underset{\underset{CH_3}{|}}{C}HCH_2O)_y(CH_2CH_2O)_xH$$

in which the average values of x and y vary from 3.3 to 106 and from 19 to 31 respectively.

9. The process according to claim 7 in which the non-ionic compound is a block copolymer having the formula:

$$HO(CH_2CH_2O)_x(\underset{\underset{CH_3}{|}}{C}HCH_2O)_y(CH_2CH_2O)_xH$$

in which the average values for x and y are about 15.5 and 28 respectively.

10. The process according to claim 7 in which the non-ionic compound is represented by the formula:

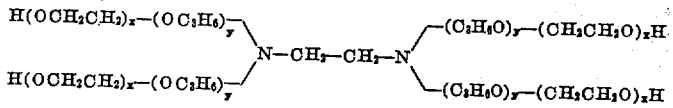

in which x represents average values of from 3.5 to 437 and y represents average values of from 3 to 17.2.

11. The process according to claim 7 in which the non-ionic compound is represented by the formula:

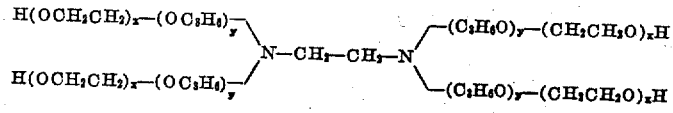

in which x and y have average values of about 3.5 and 3.0 respectively.

12. The process according to claim 7 in which the non-ionic compound is represented by the formula:

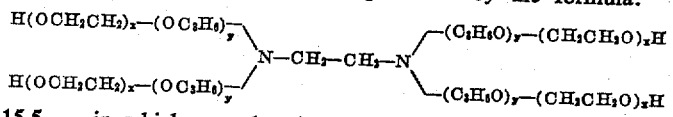

in which x and y have average values of about 12.8 and 11.6 respectively.

References Cited in the file of this patent or the original patent

UNITED STATES PATENTS

| | | |
|---|---|---|
| 2,359,750 | Collins | Oct. 10, 1944 |
| 2,362,217 | Schlosser et al. | Nov. 7, 1944 |
| 2,425,845 | Toussaint et al. | Aug. 19, 1947 |
| 2,481,278 | Ballard et al. | Sept. 6, 1949 |
| 2,481,692 | Schlosser | Sept. 13, 1949 |
| 2,674,619 | Lundsted | Apr. 6, 1954 |

OTHER REFERENCES

Wyandotte, "Pluronics," March 1, 1952.